Oct. 22, 1929.  H. WALTERS ET AL  1,732,451
RADIO INSTALLATION FOR MOVING VEHICLES
Filed Dec. 5, 1928

INVENTORS
Herbert Walters
Roman A. Hoerman,
BY
ATTORNEYS

Patented Oct. 22, 1929

1,732,451

UNITED STATES PATENT OFFICE

HERBERT WALTERS AND ROMAN A. HOERMAN, OF DETROIT, MICHIGAN

RADIO INSTALLATION FOR MOVING VEHICLES

Application filed December 5, 1928. Serial No. 324,042.

The present invention pertains to a novel radio installation for moving vehicles, particularly automobiles, and the principal object is to provide apparatus for this purpose wherein the set may be adjustably secured in various positions along the top of the vehicle.

In conformity with this object, there is provided a track suspended from the top of the vehicle, and the radio set disposed between the rails of the track carries brackets which in turn carry rollers riding on the track. One of the brackets further carries a clamp engaging the track and cooperating with one of the rollers in forming a locking device for securing the set in any desired position on the track and preventing it from rolling in consequence of the movements of the vehicle. The track moreover may be a one-piece U-shaped member of electrically conductive material so that it functions as the aerial.

Another feature of the invention is the provision of a speaker having branches extending in opposite directions longitudinally of the vehicle, so that the sound may be heard at both ends of the vehicle. The adjusting dials are provided on the lower horizontal wall of the box containing the set, in order to be easily accessible by the passengers in the vehicle.

The invention is fully disclosed by way of example in the following description and in the accompanying drawing, in which—

Reference to these views will now be made by use of like characters which are employed to designate corresponding parts throughout.

Figure 1:
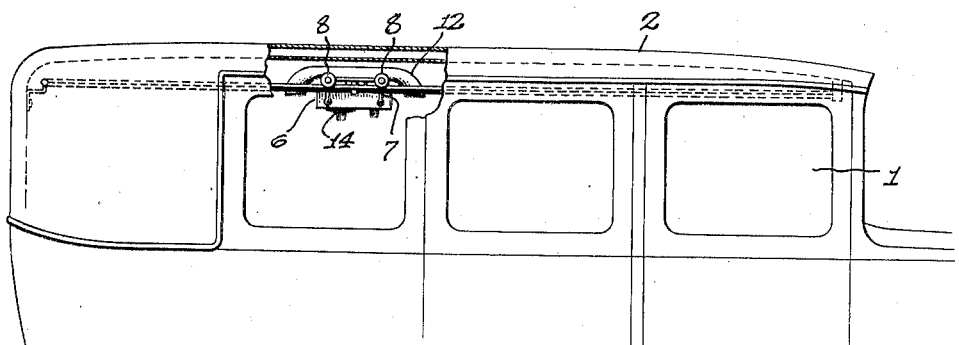
Figure 1 is a side elevation of an automobile, partly in section to illustrate the set mounted therein.
Figure 2:
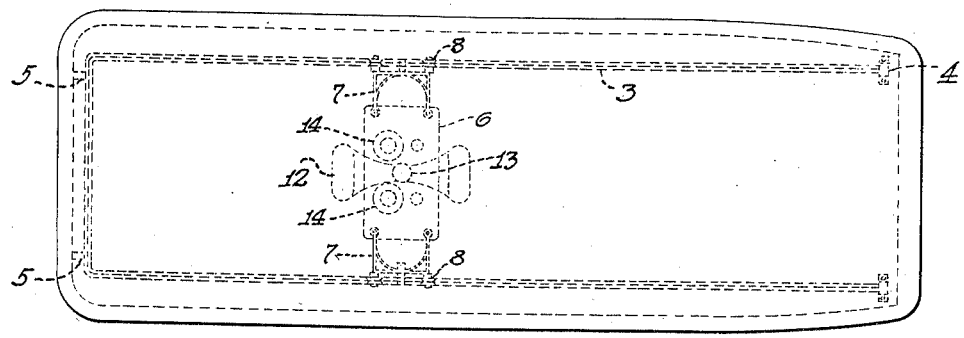
Fig. 2 is a plan view of the vehicle.
Figure 3:
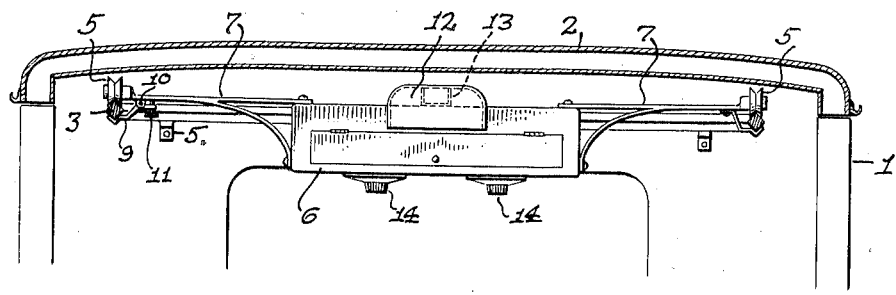
Fig. 3 is a transverse section of the top of the vehicle, showing the set in elevation.

In the several figures the vehicle is illustrated as a motor car 1 of the closed body type. From the top 2 of the car is suspended a track 3 which is preferably in the form of a one-piece U-shaped member, by means of brackets 4 at the ends of the member and another set of brackets 5 at the back or saddle thereof.

Between the rails of the track is supported a radio receiving set 6 by means of brackets 7 extending laterally therefrom and equipped with rollers 8 which ride on the track. The track is preferably of electrically conductive material, and metallic contact is maintained through the rollers and brackets, one of which is connected to the aerial terminal of the set, as a result of which the track functions as an aerial. In order to hold the set in any desired position along the track, there is provided a clamping member 9 on one of the brackets and engaging the rail at the side opposite the rollers. The member 9 is pivotally joined at 10 to the bracket and is provided with a screw 11 passed through the free end thereof and engaging the bracket. By means of this screw the clamping end may be bound against the rail, the rollers at the other side of the rail taking the thrust and serving as the other jaw of the clamp.

The speaker or horn is mounted on the top of the set 6 and includes a pair of branches 12 connected to the speaker unit 13 and extending in opposite directions longitudinally of the vehicle. By means of this arrangement, the sound is delivered to both ends of the vehicle and may be heard by passengers in the front seat as well as by those in the rear seat. The dials 14 of the set are carried on the lower horizontal wall of the set so that they may conveniently be reached by the passengers.

Although a specific embodiment of the invention has been illustrated and described, it will be understood that various alterations in the details of construction may be made without departing from the scope of the invention, as indicated by the appended claims.

What we claim is:—

1. A radio installation for moving vehicles comprising a track adapted for suspension from the top of such vehicle, a radio set between the rails of said track, brackets extending from said set towards said rails, and rollers carried by said brackets and mounted on said rails.

2. A radio installation for moving vehicles comprising a track of electrically conductive material adapted for suspension from the top of such vehicle, a radio set between the rails of said track, brackets extending from said set towards said rails, and rollers carried by said brackets and mounted on said rails.

3. A radio installation for moving vehicles comprising a one-piece U-shaped track of electrically conductive material having parallel sides, said track being adapted for suspension from the top of such vehicle, a radio set between the rails of said track, brackets extending from said set towards said rails, and rollers carried by said brackets and mounted on said rails.

4. A radio installation for moving vehicles comprising a track adapted for suspension from the top of such vehicle, a radio set between the rails of said track, brackets extending from said set towards said rails, rollers carried by said brackets and mounted on said rails, and a clamping member carried by one of said brackets and adapted for engagement with the corresponding rail at the side opposite the corresponding roller.

5. A radio installation for moving vehicles comprising a track of electrically conductive material adapted for suspension from the top of such vehicle, a radio set between the rails of said track, brackets extending from said set towards said rails, rollers carried by said brackets and mounted on said rails, and a clamping member carried by one of said brackets and adapted for engagement with the corresponding rail at the side opposite the corresponding roller.

6. A radio installation for moving vehicles comprising a track adapted for suspension from the top of such vehicle, a radio set between the rails of said track, brackets extending from said set towards said rails, rollers carried by said brackets and mounted on said rails, and a speaker extending from said set, said speaker having branches extending in opposite directions.

In testimony whereof we affix our signatures.

HERBERT WALTERS.
ROMAN A. HOERMAN.